(12) United States Patent  
Sugimura

(10) Patent No.: US 12,545,126 B2  
(45) Date of Patent: Feb. 10, 2026

(54) COMPACTION ROLLER

(71) Applicant: HONDA MOTOR CO., LTD., Tokyo (JP)

(72) Inventor: Kentaro Sugimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 700 days.

(21) Appl. No.: 17/952,579

(22) Filed: Sep. 26, 2022

(65) Prior Publication Data

US 2024/0100970 A1    Mar. 28, 2024

(51) Int. Cl.
*B60L 50/60* (2019.01)
*E01C 19/26* (2006.01)

(52) U.S. Cl.
CPC ............ *B60L 50/66* (2019.02); *E01C 19/262* (2013.01)

(58) Field of Classification Search
CPC ................................ B60L 50/66; B60L 53/80
See application file for complete search history.

(56) References Cited

U.S. PATENT DOCUMENTS

| | | | |
|---|---|---|---|
| 6,173,799 B1* | 1/2001 | Miyazaki | B62B 1/18 180/65.6 |
| 2012/0164496 A1* | 6/2012 | Lachenmeier | H01M 10/625 429/61 |
| 2024/0286496 A1* | 8/2024 | Sugimura | E01C 19/285 |

FOREIGN PATENT DOCUMENTS

| JP | 2019002199 A | * | 1/2019 |
|---|---|---|---|
| JP | 2019-065458 A | | 4/2019 |

OTHER PUBLICATIONS

For and Translation of JP 2019002199.*

* cited by examiner

*Primary Examiner* — Tara Schimpf
(74) *Attorney, Agent, or Firm* — Thomas|Horstemeyer, LLP

(57) ABSTRACT

A compaction roller comprising: a first roller rotating about a first axis; a second roller rotating about a second axis; a drive unit that supplies a driving force to at least one of the first roller and the second roller; and a storage unit that stores a battery for supplying electric power to the drive unit, wherein the storage unit allows the battery to be inserted and removed in a direction parallel to a plane passing through the first axis and the second axis.

8 Claims, 5 Drawing Sheets

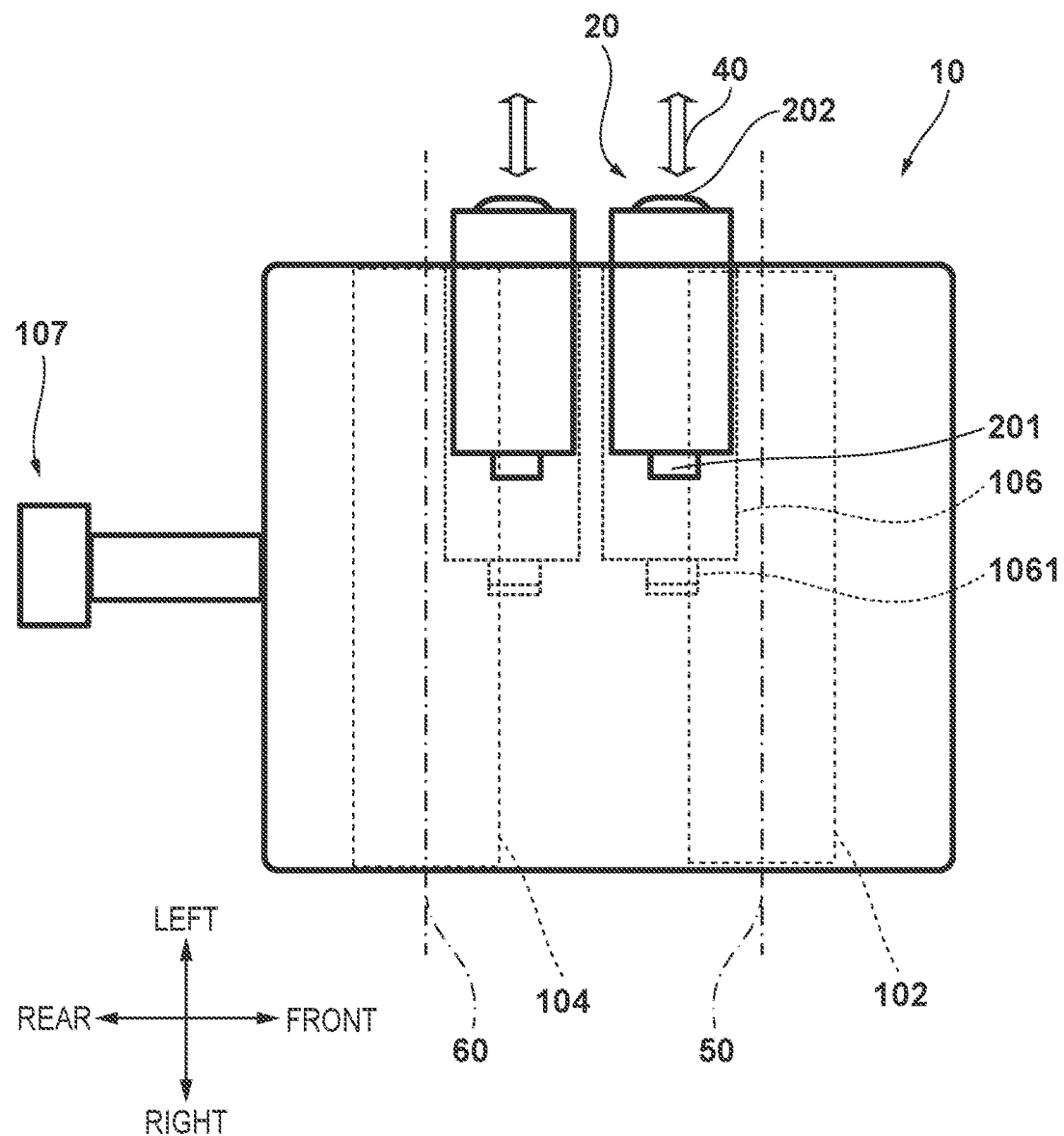

COMPACTION ROLLER

BACKGROUND OF THE INVENTION

Field of the Invention

The present invention relates to a compaction roller.

Description of the Related Art

Conventionally, as a machine used for finishing or consolidating a paved road, for example, there has been known a compaction roller that compacts a road surface as disclosed in Japanese Patent Laid-Open No. 2019-65458. Japanese Patent Laid-Open No. 2019-65458 discloses a roller including a battery that can be inserted into and removed from a vehicle body in a vertical direction.

However, in the technique described in Japanese Patent Laid-Open No. 2019-65458, there is a possibility of occurrence of a defect in the electrical system due to the vertical shake of the battery during a compaction operation. In addition, it is necessary to move the heavy battery in the vertical direction at the time of executing an insertion and removal operation, which puts a large load on the user.

The present invention has been made in view of the above problems, and provides a technique for reducing the load on the user at the time of an insertion and removal operation while reducing the vertical swing of the battery at the time of a compaction operation.

SUMMARY OF THE INVENTION

According to one aspect of the present invention, there is provided a compaction roller comprising: a first roller rotating about a first axis; a second roller rotating about a second axis; a drive unit that supplies a driving force to at least one of the first roller and the second roller; and a storage unit that stores a battery for supplying electric power to the drive unit, wherein the storage unit allows the battery to be inserted and removed in a direction parallel to a plane passing through the first axis and the second axis.

BRIEF DESCRIPTION OF THE DRAWINGS

FIG. 5 is a view of a compaction roller as observed from above according to a modification example.

DESCRIPTION OF THE EMBODIMENTS

Figure 1:
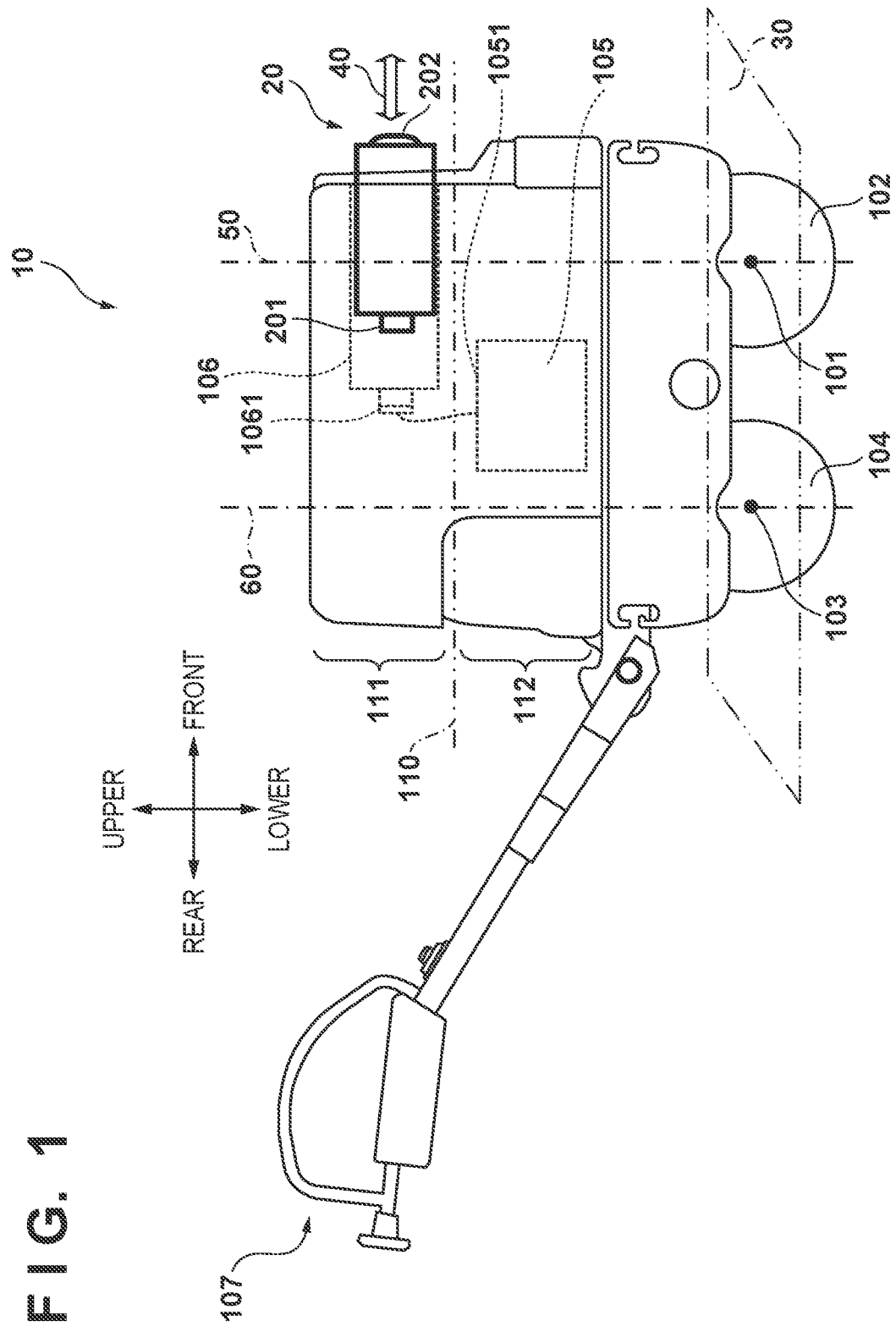
FIG. 1 is a side view of a compaction roller according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A configuration of a compaction roller according to an embodiment will be described with reference to FIGS. 1 to 4. The vertical direction, the horizontal direction, and the front-and-rear direction in the drawings indicate directions defined with respect to the vehicle body of the compaction roller. The compaction roller 10 includes a first roller 102 rotating around a first axis 101 and a second roller 104 rotating around a second axis 103. The first axis 101 and the second axis 103 are parallel axes extending in the horizontal direction of the vehicle body. The user can perform a compaction operation on the road surface, the ground, and the like while gripping a grip portion 107 and operating the compaction roller 10.

The compaction roller 10 includes a drive unit 105 that supplies a driving force to at least one of the first roller 102 and the second roller 104. The drive unit 105 is, for example, an electric motor. The compaction roller 10 includes a storage unit 106 that stores a battery 20 for supplying electric power to the drive unit 105. The storage unit 106 may be capable of storing one battery 20 or may be capable of storing a plurality of batteries 20. In the example illustrated in FIG. 2, the storage unit 106 can store the plurality of batteries 20 aligned, side by side, parallel to a plane 30 passing through the first axis 101 and the second axis 102. Accordingly, the center of gravity of the vehicle body can be lowered as compared with the case of storing the plurality of batteries 20 arranged, side by side, in the vehicle body vertical direction (in a stacked manner), and thus, it is possible to stabilize the behavior of the vehicle body against the shake generated during the compaction operation.

As illustrated in FIG. 1, of spaces 111 and 112 in the housing of the compaction roller 10, the storage unit 106 is arranged in the upper half space 111. That is, the storage unit 106 is arranged above a line 110 in the vehicle body. This eliminates the need for the user to crouch low in performing the insertion and removal operation, so that the user can easily perform the insertion and removal operation.

Figure 4:
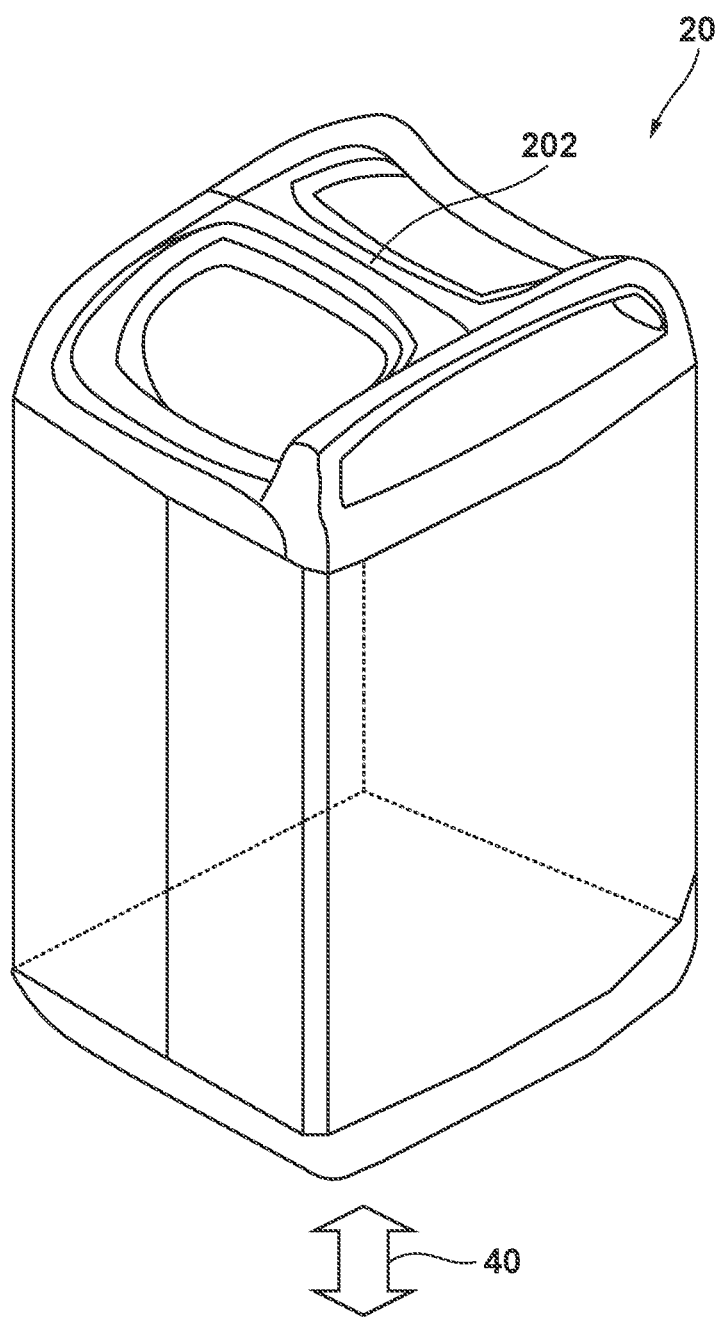
FIG. 4 is an external view of a battery according to the embodiment.

As illustrated in FIGS. 1 and 4, the battery 20 is a mobile battery which includes a terminal part 201 to be electrically connected to a terminal part 1061 of the storage unit 106 and a grip portion 202 to be gripped by the user. The user can insert and remove the battery 20 into and from the storage unit 106 along the direction of a bidirectional arrow 40. The longitudinal direction of the battery 20 is directions along the insertion and removal direction. Accordingly, the battery is inserted such that the longitudinal direction of the battery is parallel or substantially parallel to the road surface, so that the behavior of the battery can be stabilized against the shake in the vertical direction of the vehicle body. In a case where the battery 20 is inserted and removed in short-side directions of the battery 20 (that is, the directions perpendicular to the arrow 40), the position of the center of gravity becomes high, and the vehicle body is difficult to be stabilized against shaking. However, according to the configuration of the present embodiment, the stability of the vehicle body can be improved.

The storage unit 106 allows the battery 20 to be inserted and removed in directions parallel to a plane 30 passing through the first axis 101 and the second axis 102. The plane 30 is a plane parallel or substantially parallel to the road surface. A direction of connection between the terminal part 201 of the battery 20 and the terminal part 1061 of the storage unit 106 electrically connected to the terminal part 201 of the battery 20 is a direction parallel to the plane 30. Since the connection direction of the terminal part is perpendicular to the shaking direction (vertical direction) at the time of compaction, the portion of connection between the terminal parts is less likely to shift, and the terminal parts are less likely to be separated from each other. More specifically, in a structure in which the battery 20 is inserted in the vertical direction of the vehicle body, the terminal part 201 of the battery 20 moves upward due to the vertical shake generated at the time of compaction, and a force is applied in a direction away from the terminal part 1061 of the storage unit 106. Accordingly, the terminal parts can be separated from each other and electrically disconnected, which may cause a failure. On the other hand, according to the structure of the present embodiment, the terminal part 201 of the battery 20 moves in the vertical direction while being in contact with the terminal part 1061 of the storage unit 106, but the contact state can be maintained.

In the example of FIG. 1, the battery 20 is insertable in a direction from the front side of the vehicle body toward the rear side of the vehicle body, but the present invention is not limited to the illustrated example. For example, the battery 20 may be insertable in a direction from the rear side of the vehicle body toward the front side of the vehicle body. In this manner, the battery 20 may be insertable and removable in a direction parallel to the plane 30 and perpendicular to the first axis 101 or the second axis 103 (in the front-and-rear direction of the vehicle body).

Accordingly, as compared with a configuration in which the battery 20 is inserted and removed in a direction parallel to the plane 30 and parallel to the first axis 101 or the second axis 103 (in the horizontal direction of the vehicle body), when the vehicle body is inclined in the horizontal direction due to unevenness of the road surface at the time of compaction, it is possible to reduce the load applied to the portion of connection between the terminal parts of the battery 20 and the storage unit 106. Therefore, it is possible to suppress the occurrence of a failure can be suppressed.

Figure 2:
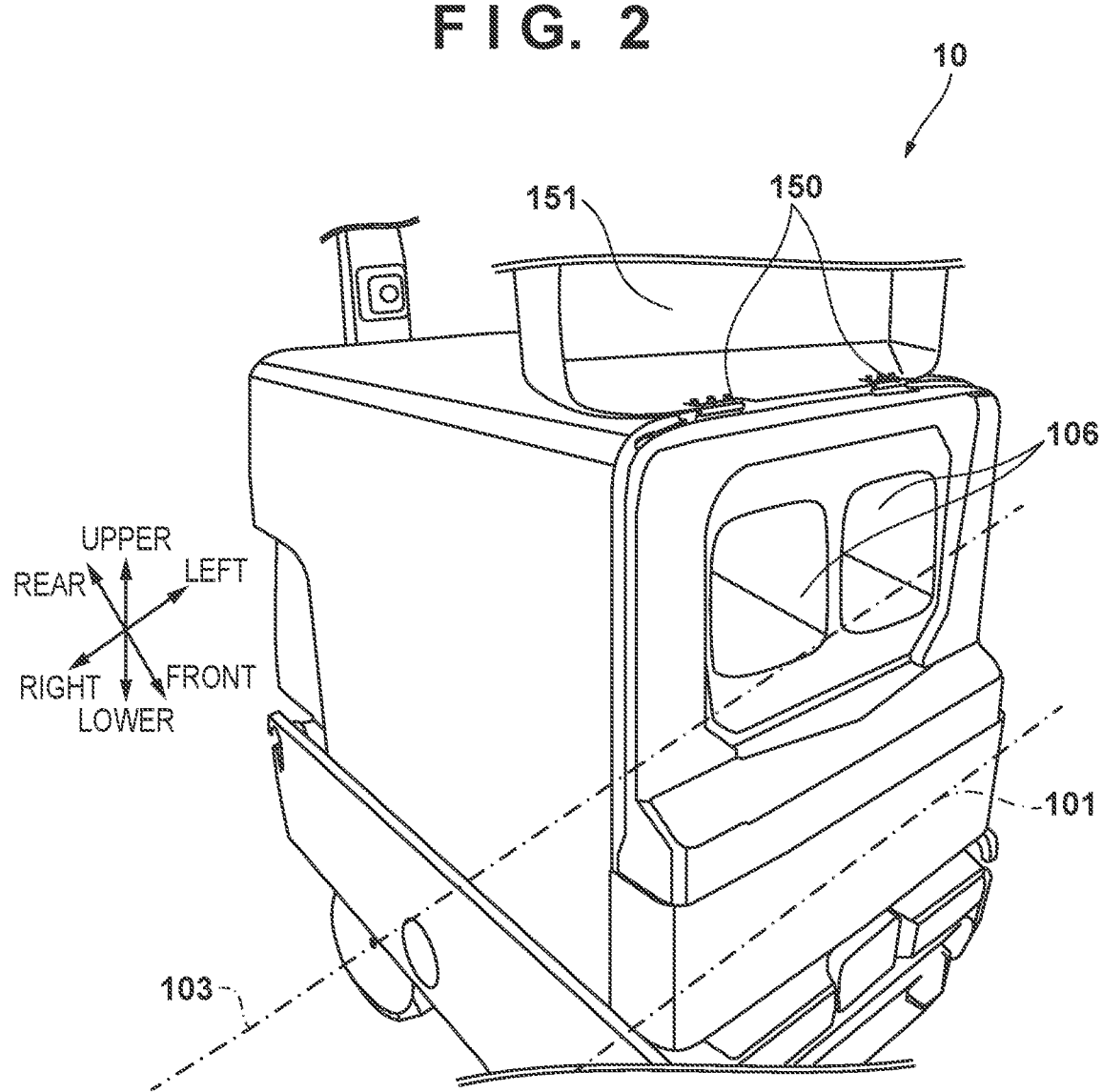
FIG. 2 is an external view of the compaction roller according to the embodiment.

In addition, as illustrated in FIG. 2, the lid portion 151 can be opened and closed via the hinge portion 150, and the storage unit 106 can store the battery 20 in a direction from the front side to the rear side of the vehicle body with the lid portion 151 opened. After the battery 20 is stored in the storage unit 106, the battery 20 may be fixed by a lock mechanism (not illustrated) so as not to move in the front-and-rear direction of the vehicle body. After the position of the battery 20 is fixed by the lock mechanism (not illustrated), the lid portion 151 is closed. The lock mechanism may be a lid portion different from the lid portion 151 provided so as to cover the inlet of the storage unit 106 in a state where the battery 20 is stored in the storage unit 106.

The terminal part 1061 of the storage unit 106 is electrically connected to the drive unit 105 by a cable or the like. In the example of FIG. 1, the drive unit 105 is arranged such that an upper end 1051 of the drive unit 105 is positioned below the terminal part 1061 of the storage unit 106. Accordingly, since the heavy position of the drive unit 105 is located below the vehicle body, the center of gravity of the vehicle body of the compaction roller 10 can be reduced, and the behavior of the vehicle body can be stabilized against the shake at the time of compaction.

Figure 3:
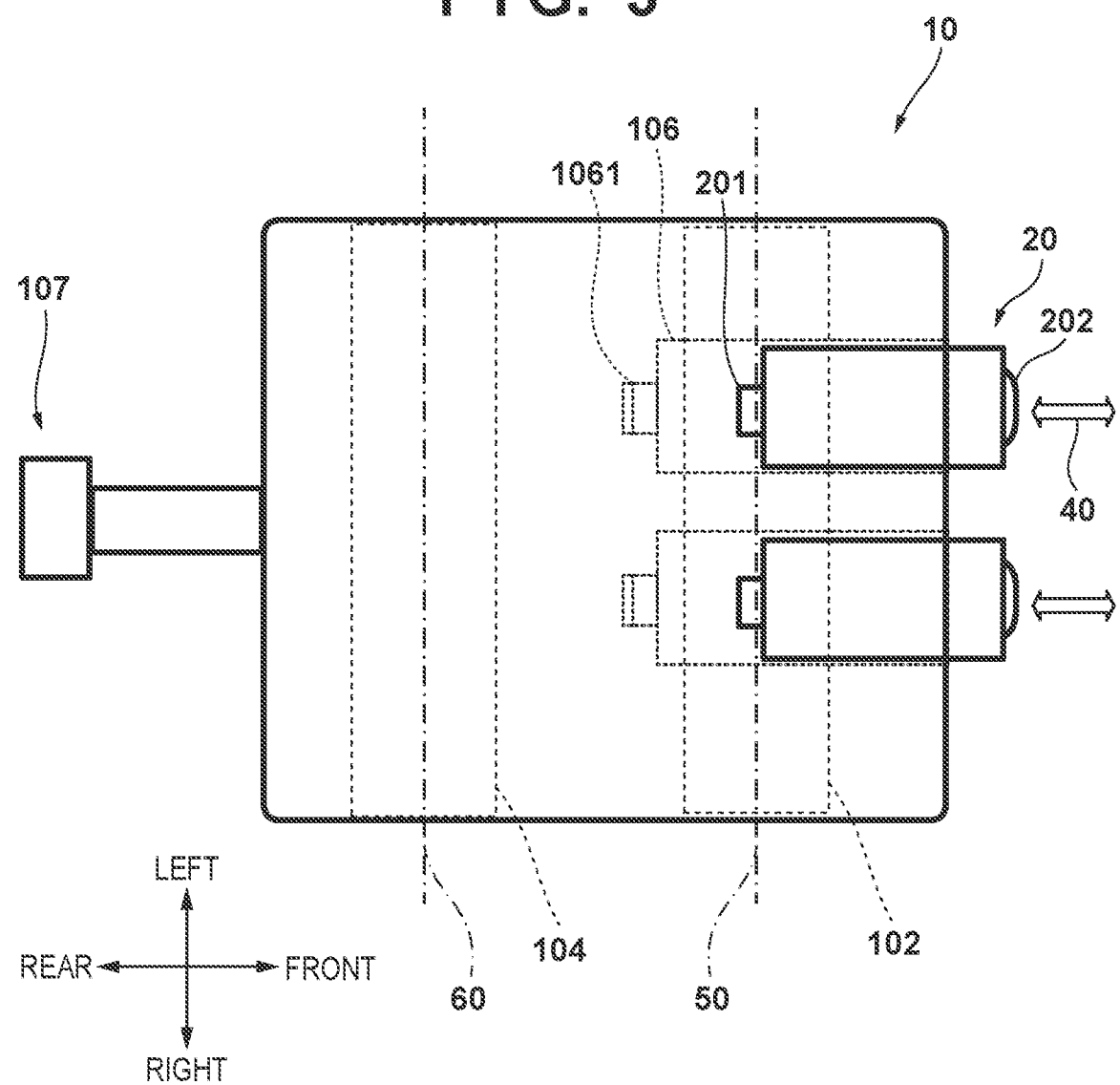
FIG. 3 is a view of the compaction roller as observed from above according to the embodiment.

As illustrated in FIGS. 1 and 3, the position of connection between the terminal part 201 of the battery 20 and the terminal part 1061 of the storage unit 106 is configured to be located between a first plane 50 passing through the first axis 101 and extending in the vehicle body vertical direction of the compaction roller 10 and a second plane 60 passing through the second axis 103 and extending in the vehicle body vertical direction of the compaction roller 10. That is, the portion of connection between the terminal parts is located at a position close to the center of the vehicle body. Accordingly, since the portion of connection is arranged at a position that is not easily affected by vibration at the time of compaction, the shaking of the portion of connection can be reduced.

As described above, according to the present embodiment, since the heavy battery is inserted in parallel or substantially parallel to the road surface, it is possible to reduce the vertical shaking of the battery that occurs during the compaction operation. Since the insertion and removal operation can be performed while receiving a heavy battery in the storage unit (battery case), it is possible to reduce a user load at the time of the insertion and removal operation.

Modification Examples

In the above-described embodiment, the battery 20 can be inserted and removed in the front-and-rear direction of the vehicle body. However, the present invention is not limited to this example. As illustrated in FIG. 5, for example, the battery 20 may be insertable and removable in a direction from the left side of the vehicle body toward the center of the vehicle body (and in a direction parallel to the plane 30). Similarly, the battery 20 may be insertable and removable in a direction from the right side of the vehicle body toward the center of the vehicle body (and in a direction parallel to the plane 30). Alternatively, in the case of storing a plurality of (for example, two) batteries 20, one battery 20 may be insertable and removable in the direction from the left side of the vehicle body toward the center of the vehicle body (and the direction parallel to the plane 30), and another battery 20 may be insertable and removable in the direction from the right side of the vehicle body toward the center of the vehicle body (and the direction parallel to the plane 30).

Summary of Embodiments

The compaction roller (10) according to a first aspect includes:
the first roller (102) rotating about the first axis (101);
the second roller (104) rotating about the second axis (103);
the drive unit that supplies a driving force to at least one of the first roller and the second roller; and
the storage unit (106) that stores the battery (20) for supplying electric power to the drive unit.

The storage unit allows the battery to be inserted and removed in the direction parallel to the plane (30) passing through the first axis and the second axis.

Accordingly, since the heavy battery is inserted in parallel or substantially parallel to the road surface, it is possible to reduce the vertical shaking of the battery that occurs during the compaction operation. Since the insertion and removal operation can be performed while receiving a heavy battery in the storage unit (battery case), it is possible to reduce a user load at the time of the insertion and removal operation. For example, in the case of storing the battery 20 from the upper side to the lower side, it is necessary to lift the battery 20 up to a position higher than the vehicle body upper surface of the compaction roller, and thus the load on the user increases. However, in the case of storing the battery from the lateral direction, it is not necessary to lift the battery to a high position, which facilitates the insertion and removal operation.

In the compaction roller according to a second aspect, the direction of connection between the terminal part (201) of the battery and the terminal part (1061) of the storage unit electrically connected to the terminal part of the battery is the direction parallel to the plane.

Accordingly, the connection direction of the terminal part is perpendicular to the shaking direction (vertical direction) at the time of compaction, so that the portion of connection between the terminal parts are less likely to shift, and the terminal parts are less likely to be separated from each other.

In the compaction roller according to a third aspect,
the storage unit allows the battery to be inserted and removed in the direction parallel to the plane and perpendicular to the first axis or the second axis (for example, in the front-and-rear direction of the vehicle body).

Accordingly, as compared with a configuration in which the battery is inserted and removed in the direction parallel to the roller axis (in the horizontal direction of the vehicle body), when the vehicle body is inclined in the horizontal direction due to unevenness of the road surface at the time of compaction, it is possible to reduce the load applied to the portion of connection between the terminal parts of the battery and the storage unit.

In the compaction roller according to a fourth aspect,
the position of connection between the terminal part (201) of the battery and the terminal part (1061) of the storage unit electrically connected to the terminal part of the battery is located between the first plane (50) passing through the first axis and extending in the vehicle body vertical direction of the compaction roller and the second plane (60) passing through the second axis and extending in the vehicle body vertical direction of the compaction roller.

Accordingly, the portion of connection between the terminal parts can be brought close to the center of the vehicle body, so that the shaking of the connection portion can be reduced.

In the compaction roller according to a fifth aspect,
the storage unit is capable of storing a plurality of batteries (FIGS. 2, 3, and 5), and
the storage unit is capable of storing the plurality of batteries arranged, side by side, parallel to the plane.

Accordingly, the center of gravity of the vehicle body can be lowered as compared with the case of storing the plurality of batteries arranged, side by side, in the vehicle body vertical direction, and thus, it is possible to stabilize the behavior of the vehicle body against the shake generated during the compaction operation.

In the compaction roller according to a sixth aspect,
the storage unit is arranged in the upper half space (111) of the space (111, 112) in the housing of the compaction roller.

This eliminates the need for the user to crouch low in performing the insertion and removal operation, so that the user can easily perform the insertion and removal operation.

In the compaction roller according to a seventh aspect,
the upper end (1051) of the drive unit is positioned below the terminal part (1061) of the storage unit.

Accordingly, since the heavy position of the drive unit is located below the vehicle body, the center of gravity of the vehicle body can be reduced, and the behavior of the vehicle body can be stabilized against the shake at the time of compaction.

In the compaction roller according to an eighth aspect,
the storage unit allows the battery to be inserted and removed such that a longitudinal direction of the battery is parallel to the plane (30) passing through the first axis and the second axis.

Accordingly, the battery is inserted such that the longitudinal direction of the battery is parallel or substantially parallel to the road surface, so that the behavior of the battery can be stabilized against the shake in the vertical direction of the vehicle body.

In the compaction roller according to a ninth aspect,
a lock mechanism for locking the battery in a state where the battery is stored in the storage unit.

Accordingly, it is possible to suppress the movement of the battery caused by the shake during the compaction operation.

According to the present invention, since the heavy battery is inserted in parallel or substantially parallel to the road surface, it is possible to reduce the vertical shaking of the battery that occurs during the compaction operation. Since the insertion and removal operation can be performed while receiving a heavy battery in the storage unit (battery case), it is possible to reduce a user load at the time of the insertion and removal operation.

The invention is not limited to the foregoing embodiments, and various variations/changes are possible within the spirit of the invention.

What is claimed is:

1. A compaction roller comprising:
a first roller rotating about a first axis;
a second roller rotating about a second axis;
a drive unit that supplies a driving force to at least one of the first roller and the second roller; and
a storage unit that stores a battery for supplying electric power to the drive unit, wherein
the storage unit allows the battery to be inserted and removed in a direction parallel to a plane passing through the first axis and the second axis,
wherein the storage unit allows the battery to be inserted and removed in the direction parallel to the plane and perpendicular to the first axis or the second axis.

2. The compaction roller according to claim 1, wherein a direction of connection between a terminal part of the battery and a terminal part of the storage unit electrically connected to the terminal part of the battery is the direction parallel to the plane.

3. The compaction roller according to claim 1, wherein a position of connection between a terminal part of the battery and a terminal part of the storage unit electrically connected to the terminal part of the battery is located between a first plane passing through the first axis and extending in a vehicle body vertical direction of the compaction roller and a second plane passing through the second axis and extending in the vehicle body vertical direction of the compaction roller.

4. The compaction roller according to claim 1, wherein
the storage unit is capable of storing a plurality of batteries, and
the storage unit is capable of storing the plurality of batteries arranged, side by side, parallel to the plane.

5. The compaction roller according to claim 1, further comprising a lock mechanism for locking the battery in a state where the battery is stored in the storage unit.

6. A compaction roller comprising:
a first roller rotating about a first axis;
a second roller rotating about a second axis;
a drive unit that supplies a driving force to at least one of the first roller and the second roller; and
a storage unit that stores a battery for supplying electric power to the drive unit, wherein the storage unit allows the battery to be inserted and removed in a direction parallel to a plane passing through the first axis and the second axis, wherein the storage unit is arranged in an upper half of a space in a housing of the compaction roller.

7. A compaction roller comprising:
a first roller rotating about a first axis;
a second roller rotating about a second axis;
a drive unit that supplies a driving force to at least one of the first roller and the second roller; and
a storage unit that stores a battery for supplying electric power to the drive unit, wherein
the storage unit allows the battery to be inserted and removed in a direction parallel to a plane passing through the first axis and the second axis,
wherein an upper end of the drive unit is positioned below a terminal part of the storage unit.

8. A compaction roller comprising:
a first roller rotating about a first axis;
a second roller rotating about a second axis;
a drive unit that supplies a driving force to at least one of the first roller and the second roller; and
a storage unit that stores a battery for supplying electric power to the drive unit, wherein
the storage unit allows the battery to be inserted and removed in a direction parallel to a plane passing through the first axis and the second axis,
wherein the storage unit allows the battery to be inserted and removed such that a longitudinal direction of the battery is parallel to the plane passing through the first axis and the second axis.

* * * * *